Figure 1:
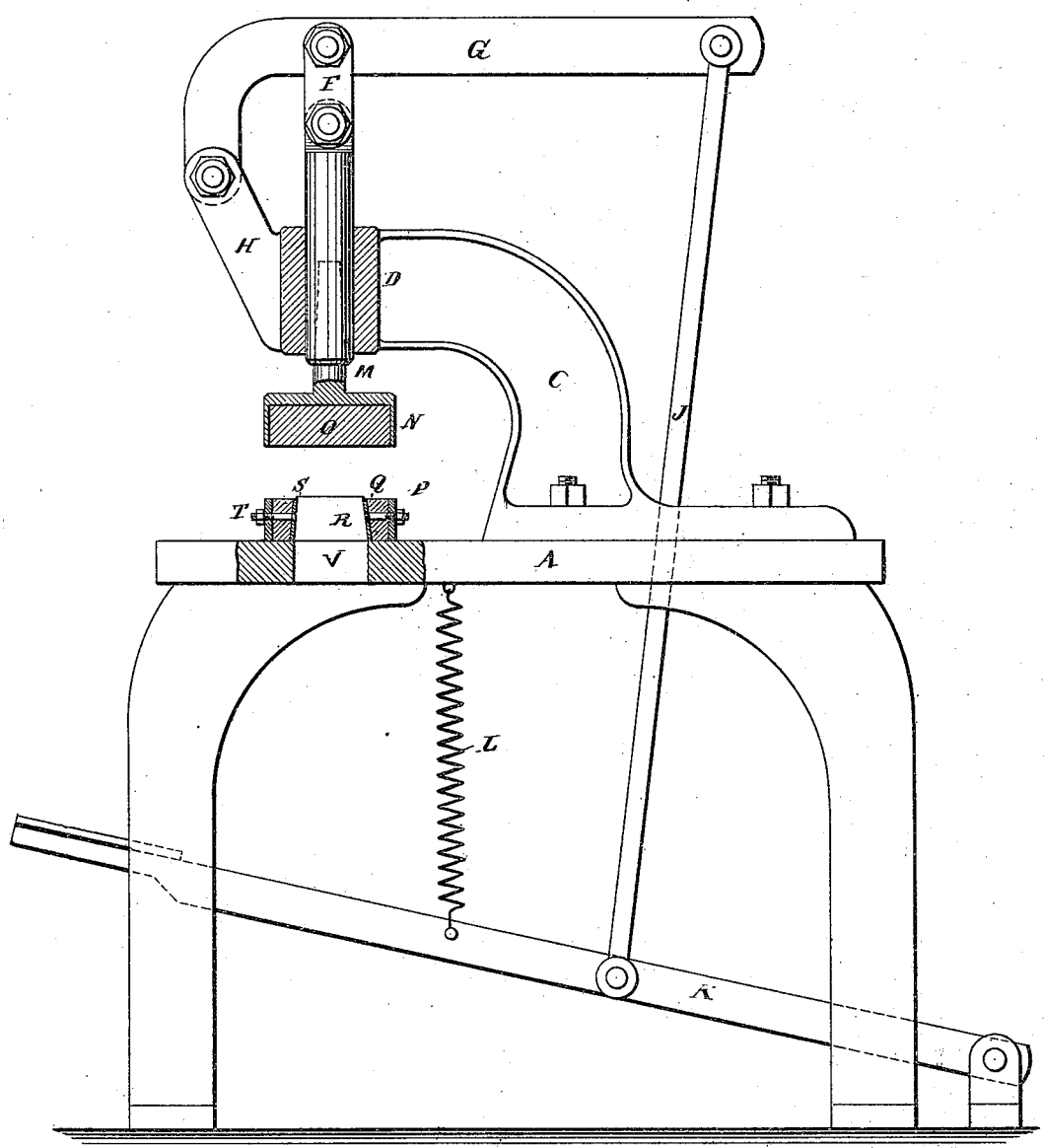

(No Model.) 2 Sheets—Sheet 1.

W. H. FORBES.
MACHINE FOR CUTTING CIGAR WRAPPERS AND BINDERS.

No. 356,113. Patented Jan. 18, 1887.

WITNESSES: INVENTOR (No Model.) 2 Sheets—Sheet 2.
W. H. FORBES.
MACHINE FOR CUTTING CIGAR WRAPPERS AND BINDERS.
No. 356,113. Patented Jan. 18, 1887.
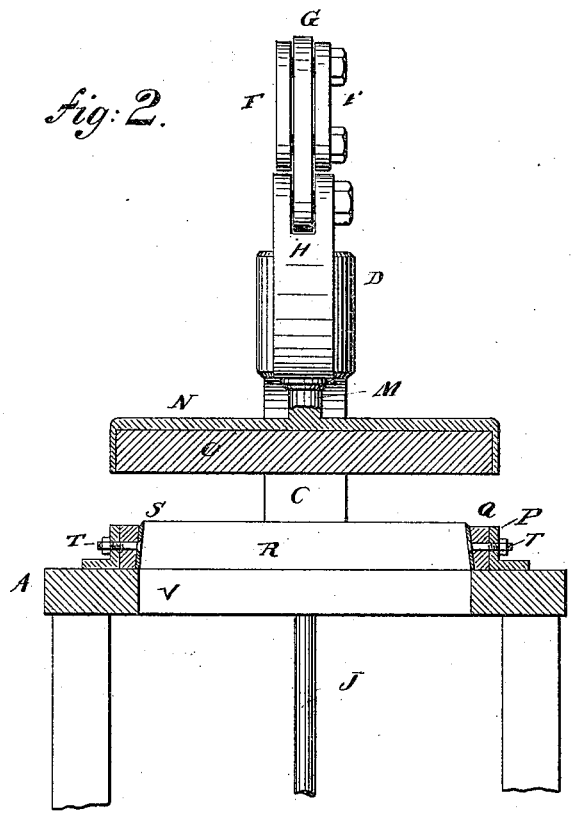
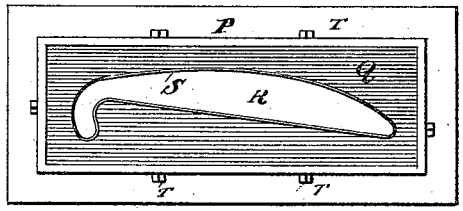

UNITED STATES PATENT OFFICE.

WILLIAM H. FORBES, OF NEW YORK, N. Y., ASSIGNOR TO DAVID I. BOEHM, OF SAME PLACE.

MACHINE FOR CUTTING CIGAR WRAPPERS AND BINDERS.

SPECIFICATION forming part of Letters Patent No. 356,113, dated January 18, 1887.

Application filed March 1, 1886. Serial No. 193,578. (No model.)

*To all whom it may concern:*

Be it known that I, WILLIAM H. FORBES, of the city, county, and State of New York, have invented certain new and useful Improvements in Machines for Cutting Cigar Wrappers and Binders, of which the following is a specification.

The object of my invention is to provide a new and improved machine for cutting wrappers and binders for cigars.

In the accompanying drawings, Figure 1 represents a side view of my improved cigar wrapper and binder cutter, parts being broken out and others in section. Fig. 2 is a front view of the same, parts being broken out and others in section. Fig. 3 is a top view of the die in which the knife is held.

Similar letters of reference indicate corresponding parts.

The table A is supported on suitable legs, and on said table a curved standard, C, is secured, in the upper end of which the vertical bearing D is provided, in which the plunger E works up and down freely, the upper end of the plunger being connected by the links F with the lever G, the front end of which is pivoted to an arm, H, projecting upwardly and from the curved standard C, the rear end of the lever being connected by the rod J with the lever K, pivoted to the floor or to the lower part of the frame of the machine, and connected to the spring L, fastened to the table or platform, for the purpose of pulling the foot-lever upward.

In the lower end of the plunger E the stem M of an inverted socket, N, is inserted, and is suitably fastened, either by frictional contact only or by fastening devices. In the said socket N a block, O, of rubber is placed.

On the table A a die-box, P, is fastened, in which the rubber block Q is held, said block having an opening, R, which is slightly larger than the wrapper to be cut, and is of a shape conforming to that of the wrapper. On the sides of said opening the knife S is held by screws T, passed through the said knife, through the rubber Q, and through the die-box P, the sides of the knife being slightly inclined toward each other from the bottom to the top, so as to permit the cut wrapper to pass through the opening between the sides of the knife quite readily. The top cutting-edges of the knife project from the upper surface of the rubber block Q a distance about equal to the thickness of the tobacco-leaf. An opening, V, of about the same size and shape as the opening in the block Q, or, if desired, larger, is formed in the table A, to permit the wrapper to drop through it. The rubber block O is somewhat harder or more tenacious than the rubber block Q. The box P, knife S, and the rubber block Q form the die.

The operation is as follows: The tobacco-leaf is placed on the die, and the rubber block O is forced down upon the die by depressing the swinging end of the foot-lever K, whereby the upper cutting-edge of the knife S is forced through the tobacco-leaf and cuts out a wrapper of the shape and size of the knife. When the foot is removed from the foot-lever, the spring L draws the lever upward, thereby lifting the lever G and the rubber block O. The knife must be arranged to project but slightly from the upper block, Q, so as not to cut too deep into the rubber block O and ruin the same. Wrappers of any size and shape may be cut by means of this machine, as knives of different sizes and shapes can be used.

Machines for cutting cigar-wrappers have heretofore been constructed provided with dies having spring-actuated followers, and the upper dies of such machines have also been constructed of hard rubber or wood, against which the knife of the lower die abuts when the leaf is cut; but in my invention the upper die is composed of a solid piece of soft rubber, which covers the entire area of the lower die, and the lower die is provided around the knife with a layer of soft rubber. In this construction the meeting faces of the dies, being resilient, do not crush or break the leaf, as is the case where adjustable plungers are used, and in which the meeting faces of the dies are hard.

Having thus described my invention, I claim as new and desire to secure by Letters Patent—

In a cigar-wrapper cutter, the combination, with a movable presser-block composed of soft rubber, of a bed-die comprising a metallic die-box, a block of soft rubber therein somewhat harder than the rubber of the presser-block, said bed-block being provided with an aperture about the size and shape of the wrapper to be cut, and a knife projecting slightly above the upper surface of the rubber block, substantially as described.

In testimony that I claim the foregoing as my invention I have signed my name in presence of two subscribing witnesses.

WILLIAM H. FORBES.

Witnesses:
OSCAR F. GUNZ,
MARTIN PETRY.